(12) United States Patent
Attaluri et al.

(10) Patent No.: US 6,466,931 B1
(45) Date of Patent: Oct. 15, 2002

(54) METHOD AND SYSTEM FOR TRANSPARENTLY CACHING AND REUSING QUERY EXECUTION PLANS EFFICIENTLY

(75) Inventors: Gopi Krishna Attaluri, Sunnyvale; David Joseph Wisneski, Morgan Hill, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/364,755

(22) Filed: Jul. 30, 1999

(51) Int. Cl.[7] .............................................. G06F 17/30
(52) U.S. Cl. ...................... 707/2; 707/1; 707/3; 707/4; 707/5
(58) Field of Search ................................ 707/2, 3, 4, 5, 707/1, 103 R, 103 Y, 103, 103 Z, 202

(56) References Cited

U.S. PATENT DOCUMENTS

| | | | |
|---|---|---|---|
| 5,161,225 A | | 11/1992 | Abraham et al. |
| 5,367,675 A | * | 11/1994 | Cheng et al. ............... 395/600 |
| 5,481,703 A | * | 1/1996 | Kato ............................ 395/600 |
| 5,608,904 A | | 3/1997 | Chaudhuri et al. |
| 5,668,987 A | | 9/1997 | Schneider |
| 5,694,491 A | * | 12/1997 | Du et al. ..................... 395/602 |
| 5,706,506 A | | 1/1998 | Jensen et al. |
| 5,758,149 A | | 5/1998 | Bierma et al. |
| 5,809,566 A | | 9/1998 | Charney et al. |
| 5,812,996 A | | 9/1998 | Rubin et al. |
| 5,822,749 A | | 10/1998 | Agarwal |
| 5,842,203 A | | 11/1998 | D'Elena et al. |
| 5,937,401 A | * | 8/1999 | Hillegas ........................ 707/2 |
| 6,012,054 A | * | 1/2000 | Seputis ......................... 707/2 |
| 6,012,085 A | * | 1/2000 | Yohe et al. ................. 709/217 |
| 6,026,391 A | * | 2/2000 | Osborn et al. ................. 707/2 |
| 6,073,129 A | * | 6/2000 | Levine et al. .................. 707/4 |

* cited by examiner

Primary Examiner—Jean M. Corrielus
Assistant Examiner—Tam Nguyen
(74) Attorney, Agent, or Firm—Sawyer Law Group LLP

(57) ABSTRACT

A method and system for transparently caching and reusing database query execution plans. The method and system include caching a first query that contains a first constant. A first query is associated with an execution plan that represent the first constant with a parameter name. The method and system further include receiving a new query that contains a second constant and comparing the new query with the first query. A match is determined to exist even when the second constant fails to match the first constant. Upon a match, the first query execution plan is reused by substituting the parameter name in the query execution plan with the second constant from the new query, thereby avoiding generating a new query

26 Claims, 3 Drawing Sheets

METHOD AND SYSTEM FOR TRANSPARENTLY CACHING AND REUSING QUERY EXECUTION PLANS EFFICIENTLY

FIELD OF THE INVENTION

The present invention relates to databases, and more particularly to transparently caching and reusing database query execution plans.

BACKGROUND OF THE INVENTION

Today's object-oriented database environments are typically used as front-ends to more simplistic but efficient data models, such as flat files and relational databases. In a relational database, data is perceived by its users as a collection of tables. The tables in a relational database include a row of column names specifying one or more attribute fields, and zero or more data rows containing one scalar value for each of the column fields.

In operation, a client submits a semantic-rich query at the object-level to the database system. Because the object-oriented model is much more sophisticated and complicated than a relational model, it is usually more expensive to process a query in the object space. Therefore, the database system converts the object-oriented query into a relational query that queries the relational database. This is accomplished by generating an execution plan specifying what queries to run against the relational databases, and how to combine those results to compute the final result.

As an example, assume that a user has the following query: "Find all employees having a salary greater than $100,000." This query, which is expressed in English, could be represented as the following object space query (depending on the computer language): "Select e from EmpClassMOHome e where e.salary>100000". In the example, "EmpClassMOHome," identifies a class of objects similar to a table in a relational space, and "e" represents a specific instance in that class.

This query would then be converted into a corresponding relational query in the execution plan. Relational queries to a relational database are carried out through high-level commands or statements, such as SELECT, INSERT, UPDATE and DELETE, which are examples of statements from standard SQL (Structured Query Language). The object space query from the example above would be translated into a query execution plan containing the following query:

SELECT *
FROM Employee
WHERE salary>100,000

The SELECT command specifies the desired attributes to be returned FROM a specified table WHERE some specified condition is true. In this example, a "*" in the SELECT clause means that all attributes from the "Employee" table should be returned for all records meeting the condition in the WHERE clause. The WHERE clause includes one or more literals, each of which includes at least one attribute (e.g., salary), an operator (e.g., >), and either a constant value (e.g., 100,000) or another attribute.

Unfortunately, generating an execution plan from an object query is CPU intensive and may take significantly longer time than even executing the plan against the relational database. Most time in generating the execution plan is spent parsing and analyzing the complex metadata that maps the object attributes to relations.

To minimize this overhead, some systems cache the queries and their corresponding plans. If a new user query matches a cached query, the cached execution plan is reused for the new query. There are generally two methods for caching queries and plans.

One method for caching queries is manual in that it requires the database user to explicitly request the database system to prepare a query (also generate and save the execution plan internally), and then return a handle to it. The user may then reuse that query several times by submitting the same handle to the database system each time the user desires to issue that same query.

Another method replaces all constant values in the query with host variables. An example is:

SELECT id
FROM Employee
WHERE name=:hostv1

The user then specifies a constant value for the host variable (e.g., :hostv1="Vader") and submits the query. The host-variable query can then be reused several times, each time specifying different constant values for host variables.

Although the manual and host-variable techniques cache and reuse certain queries, the caching and reuse of the execution plans is non-transparent to the user because the user is aware of, and is required to explicitly facilitate reuse of the execution plans. In addition, some systems that do not support host-variables are limited because they only reuse query execution plans when a new query string exactly matches a cached query string, including constant values. Thus, given the following to queries:

(1) SELECT id FROM Employee WHERE name="Luke" and (2) SELECT id FROM Employee WHERE name="Skywalker", conventional methods would consider the two queries different and would spend the time to generate an entirely new execution plan for the second query.

Accordingly, what is needed is a system and method for transparently and efficiently caching and reusing database query execution plans. The present invention addresses such a need.

SUMMARY OF THE INVENTION

The present invention is a method and system for transparently caching and reusing database query execution plans. The method and system include caching a first query that contains a first constant. A first query execution plan is also generated for the query that represents the first constant with a parameter name. The method and system further include receiving a new query that contains second constant. The new query is compared with the first query and a match is determined to exist even when the second constant in the new query fails to match the first constant from the first query. Upon a match, the first query execution plan is reused by substituting the parameter name in the query execution plan with the second constant from the new query without user intervention, thereby avoiding generating a new query execution plan for the new query.

According to the present invention, a more flexible definition of a query match is provided, leading to more frequent reuse of execution plans and increase in system speed. Moreover, the reusable execution plan is obtained for a matching new query at a fraction of the cost of generating a new execution plan.

DETAILED DESCRIPTION

The present invention relates to transparently caching and reusing database query execution plans. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, although the present invention will be disclosed in terms of a database environment having an object-oriented front-end and a relational database back-end, the present invention is independent of the object model and independent of the backend database mode. Thus, the present invention is not intended to be limited to the embodiment shown but is to be accorded the widest scope consistent with the principles and features described herein.

Figure 1:
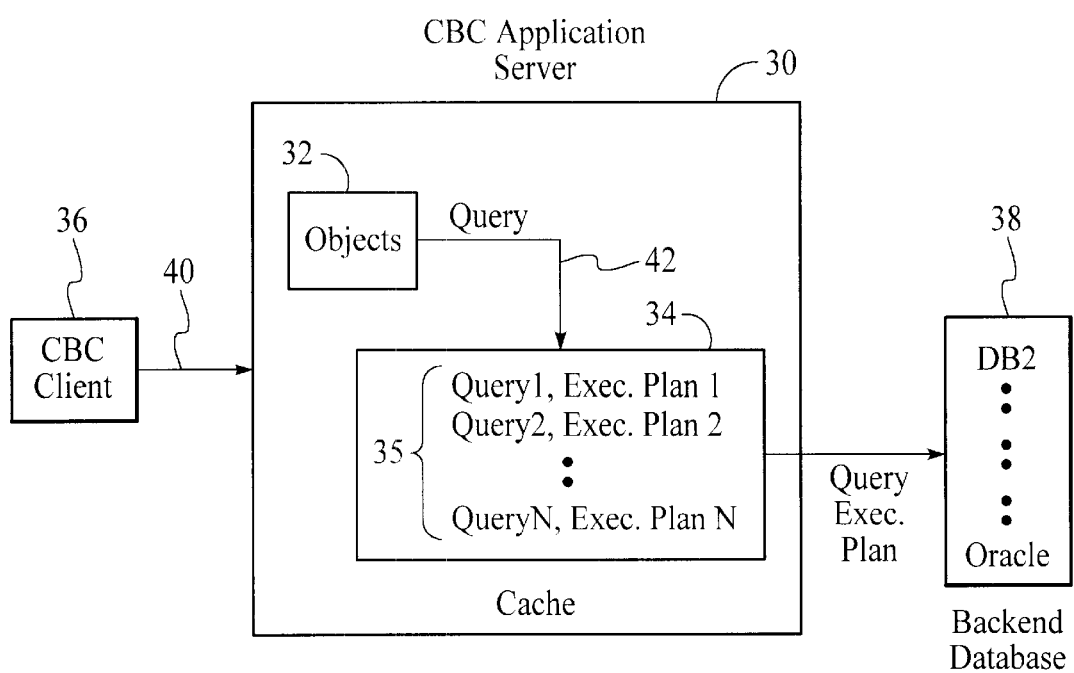
FIG. 1 is a block diagram illustrating the operating environment of the present invention.

FIG. 1 is a block diagram illustrating the operating environment of the present invention. A component broker connector (CBC) application server 30 provides an object-oriented environment for developing and/or administrating applications for background databases 38, whether relational or IMS. The CBC application server 30 includes a collection of objects 32 and a cache 34. A CBC client 36 submits semantic-rich queries regarding objects in the database 38 to the CBC application server 30.

The CBC application server 30, which also manages the details of the interaction with the client (e.g., connection and context), receives the object query and translates the queries from object space into database space (e.g., relational or Customer Information Control System (CICS), an IMS hierarchical database). The CBC application server 30 includes metadata that defines how objects 32 are mapped to the back-end relational data. When a query is received, the CBC application server 30 parses and analyzes the metadata and generates the execution plan that specifies what queries to run against the relational databases.

As stated above, generating an execution plan from an object query is CPU intensive and may take significantly longer time than executing the plan against the relational database, unless the result set is large. The goal is to reduce the overhead of parsing and analyzing the complex metadata in generating the execution plan. To minimize this overhead, queries 35 that were processed in the recent past in accordance with the present invention and their corresponding execution plans are saved in the cache 34. If a new user query 40 matches a cached query 35, then the corresponding cached execution plan is reused for the new query.

Prior methods for caching and reusing query execution plans have several drawbacks. One drawback is that both the manual reuse method and the host-variable method require explicit user interaction. Another drawback is that the systems that do not support host-variables have limited matching schemes because a cached execution plan will not be reused unless its corresponding cached query identically matches a new query. This is important because when a match fails a new execution plan, which can be large (at least 2 K bytes), must be generated.

The present invention provides an improved scheme for caching and reusing query execution plans that is transparent to the user. The present invention provides a more flexible definition of a query match, leading to a more frequent reuse of execution plans and an increase in system speed. According to the present invention, the definition of a query match is broadened so that a cached execution plan is reused even when two queries match do not identically match. During a comparison, between two queries, constants are ignored so that a match is declared even when the queries have non-matching constants.

Figure 2:
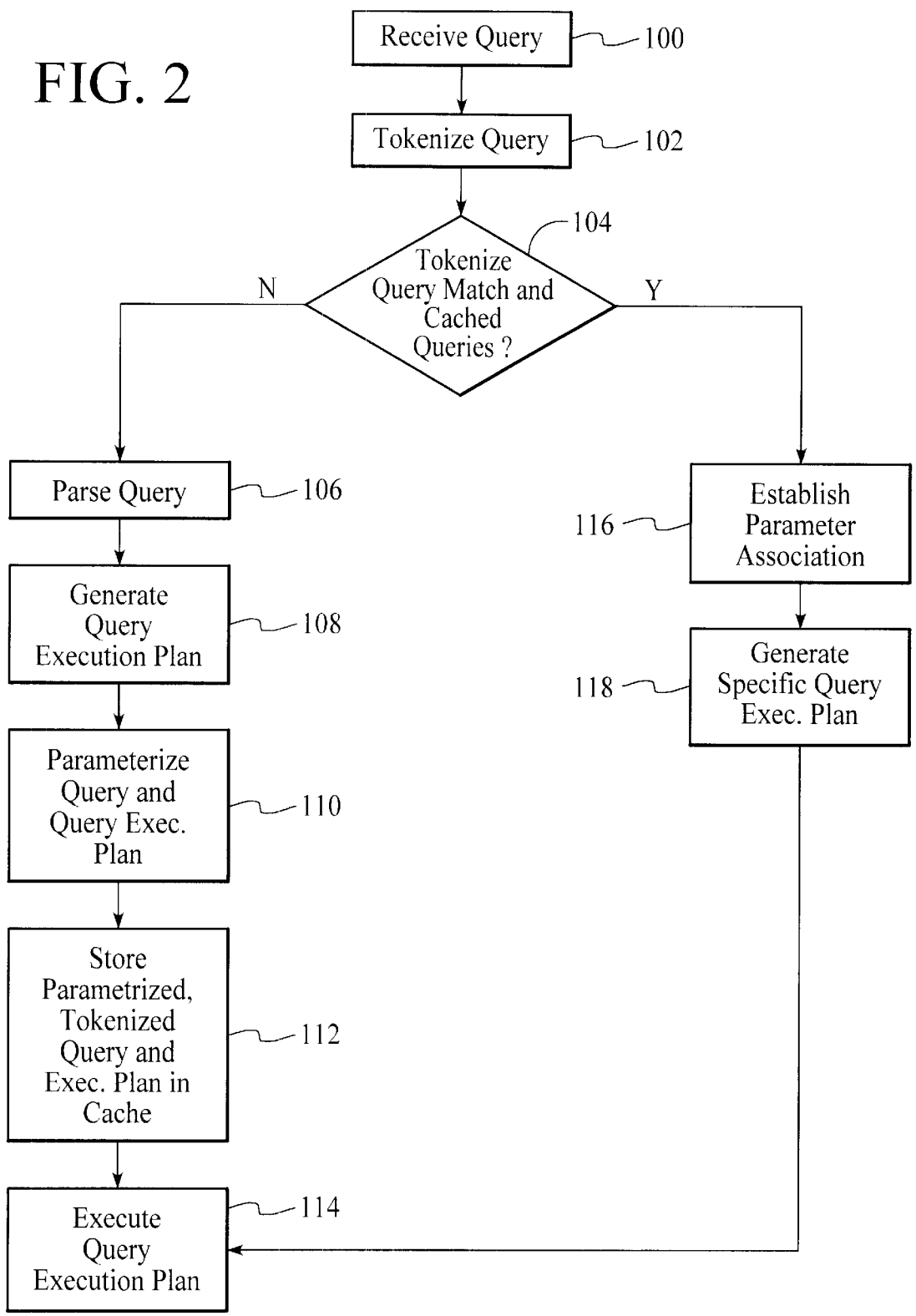
FIG. 2 is a flow chart illustrating the steps comprising the process of transparently caching and reusing query execution plans in accordance with the present invention.

FIG. 2 is a flow chart illustrating the steps comprising the process of transparently caching and reusing query execution plans in accordance with the present invention. In a preferred embodiment, the following steps are performed by the CBC application server 30, although any software program or hardware for implementing the process may also be used.

The process begins once a query 40 is received in step 100. As described above, a query is a string of words representing database commands and constants. After the query 40 is received, the query 40 is tokenized in step 102. During tokenization, each word in the query 40 is converted into a number representing the word. The tokens identify object classes, constants, commands, and so on.

After the query 40 is tokenized to provide a tokenized query 42, the tokenized query 42 is compared to queries stored in the cache 34 in step 104. If no queries are present in the cache 34, then query 40 is the first query, and must be processed and stored in the cache 34 for possible reuse.

The process then proceeds to step 106, where the tokenized query 42 is parsed using a well-known parsing procedure. The output of parsing and the stored metadata are used to generate a query execution plan in step 108, as described above. The query execution plan resembles a program or algorithm that defines the mapping between objects and relational data, how touples are returned from the relational database, how to post process the data, and return the results to the client 36.

After the query execution plan is generated, both the tokenized query 42 and the execution plan are parameterized in step 110. Parameterization is the assignment of parameter names to constants, which facilitates the reuse of cached execution plans. For example, assume a query includes three constants, "500", "600" and "700". During parameterization, each of these parameters in both the tokenized query 42 and its execution plan would be assigned parameter names, such as "param1", "param2", and "param3", respectively.

Next, the tokenized and parameterized query and its corresponding parameterized execution plan are stored in the cache 34 in step 112 in an attempt to reuse the execution plan for future queries. Thereafter, the execution plan is executed in order to query the database 38 in step 114.

Referring again to step 104, if a query is present in the cache, then the query 40 received in step 100 (and the corresponding tokenized query 42) is not the first query received. It is therefore referred to as a new query 40. The tokens of the new tokenized query 42 are compared with the tokens of the cached queries 35. According to the present invention, the definition of a query match is broadened by ignoring the tokens representing constants during the comparison, such a match will be declared even when two queries have non-matching constants. Therefore, the new tokenized query 42 will match a cached query 35 in step 104 when all of their tokens match except for the tokens that represent constants. And since numbers are compared rather than characters during the token comparison, the process is faster which means that the cache 34 may be made larger without impacting performance.

If a match is found between the new tokenized query 42 and a cached query 35, then parameter association is established in step 116. In parameter association, each constant contained in the new the tokenized query 42 is associated with a parameter name from the matching cached query 35.

Once this association is established, a specific query execution plan is generated for the new tokenized query 42 by substituting the parameters in the cached execution plan of the matching query 35 with the corresponding constants in the new tokenized query 42 in step 118.

After the specific execution plan for the new query 40 has been generated using the original execution plan, the specific execution plan is executed in step 114, and the database is queried without generating a new plan for the query 40.

Figure 3:
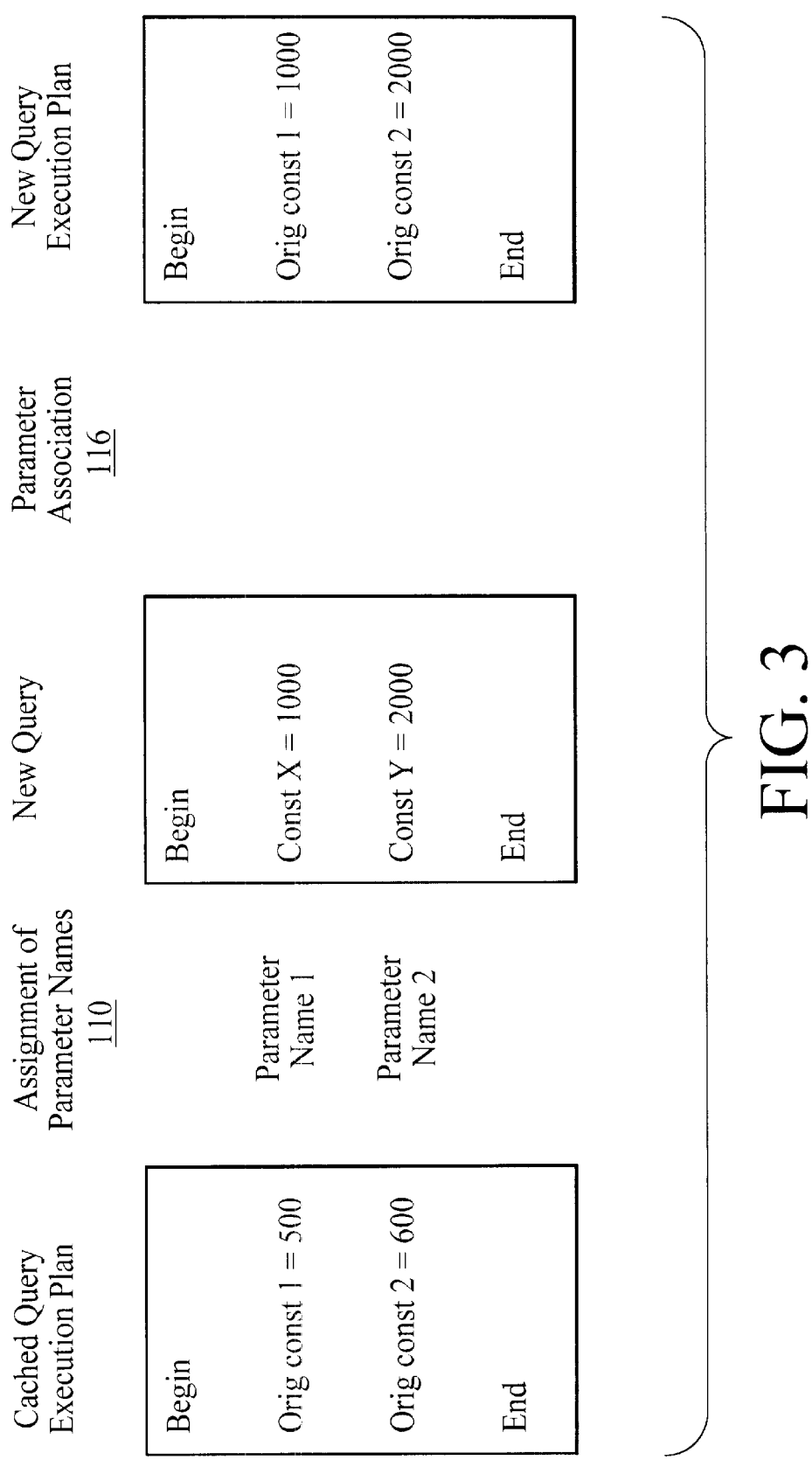
FIG. 3 is a block diagram illustrating an example of establishing parameter association to replace the constants from an original query execution plan with the constants from a new query.

FIG. 3 is a block diagram illustrating an example of establishing parameter association to replace the parameters from an original query execution plan with the constants from a new query. The example shows an original query execution plan that includes two constants having values of "500" and "600", respectively. After paramertization (step 110), parameter names, "parameter name 1" and "parameter name 2", are assigned to the constants. Now assume that a new query, containing two constants having values of "1000" and "200", respectively, matches an original query in the cache corresponding to the query execution plan. Parameter association (step 116) will associate the constants in the new query with the parameters from the original execution plan. Thereafter, a new query execution plan is generated for the new query by substituting the parameters in the original query execution plan with the corresponding constants in the new query, as shown.

Referring again to FIG. 2, in a preferred embodiment of the present invention, the search for matching cached queries in step 104 is speeded up by generating a signature for each query during tokenization. To generate a signature; key characteristics of the query are identified, such as the number of SELECT statements it contains, for example, and the signature is generated from these characteristics. The query is then hashed based on its signature. The cache is also partitioned according to hash groupings. Given a new query, a search for a matching query in the cache is limited to only the partition in the cache that the new query's signature hashes to, thus reducing the number of comparisons.

A method and system for transparently caching and reusing database query execution plans has been disclosed that provides a more flexible definition of a query match, leading to more frequent reuse of execution plans and increase in system speed. In addition, the present invention provides a format for caching queries that increases query matching speed and reduces the overhead of caching, and the cache organization ignores cached queries that are incompatible with new query during the search for a matching queries due to the use of signatures.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for transparently caching and reusing database query execution plans, the method comprising the steps of:

(a) caching a first query that contains a first constant, wherein a first query execution plan has been generated for the first query that represents the fist constant with a parameter name;

(b) receiving a new query that contains a second constant;

(c) generating signatures for the new query and the first query;

(d) if the signatures match, comparing the new query with the first query and determining that a match exists even when the second constant fails to match the first constant; and (e) upon a match, reusing the first query execution plan by substituting the parameter name in the first query execution plan with the second constant from the new query, thereby avoiding generating a new query execution plan for the new query.

2. The method of claim 1 wherein the first query and the new query are in string form, steps (a) and (b) further including the step of:

i) tokenizing the first query by converting the fist query string into a first token and tokenizing the new query by converting the new query string into a new token, thereby providing a first tokenized query and a new tokenized query.

3. The method of claim 2 wherein step (a) further includes the step of:

ii) caching the first tokenized query.

4. The method of claim 3 wherein step (d) further includes the step of:

i) comparing the first token to the new token.

5. The method of claim 4 wherein step (e) further includes the step of:

i) establishing parameter association by associating the second constant in the new query with the parameter name representing the first constant in the first query.

6. The method of claim 1 wherein the new query string and the first query string include database commands, the method further including the step of:

i) generating signatures for the new query and the first query by hashing the database commands contained therein.

7. A system for transparently caching and reusing query execution plans, wherein a client submits a database query in string form containing a first constant, the system comprising:

an application server coupled to the client for receiving the query;

a cache for storing a previously processed query in suing form containing a second constant;

means for generating signatures for the database query and the cached query;

means for comparing the query to the cached query if they have matching signatures, and determining that the query matches the cached query even when the second constant fails to match the first constant, wherein upon a match, a query execution plan generated for the cached query is reused by substituting a parameter name representing the second constant in the query execution plan with the first constant from the database query, thereby avoiding generating a new query execution plan for the database query.

8. The system as in claim 7 wherein the database query and the cached query are tokenized to provide a tokenized query and a tokenized cached query.

9. The system as in claim 8 wherein the tokenized query and the tokenized cached query are compared by comparing tokens.

10. A method for transparently caching and reusing database query execution plans, the method comprising the steps of:
   (a) receiving a first query in string form containing a first constant;
   (b) generating a fist execution plan for the first query, the first execution plan including the first constant;
   (c) storing the first query and the execution plan in a cache;
   (d) executing the first execution plan to query the database;
   (e) receiving a second query in string form containing a second constant;
   (f) generating signatures for The first query and the second query; and
   (g) comparing the second query to the first query only if the first and second queries have matching signatures, wherein the first and second constants are ignored during the comparison; and
   (h) if the second query matches the first query, updating the first execution plan by
      i) substituting the first constant in the first execution plan with the second constant, and
      ii) executing the updated query execution plan, wherein the generation of a second execution plan for the second query is avoided even though the second constant may not match the first constant.

11. The method of claim 10 further including the steps of:
   (h) if the second query does not match the first query, generating a second execution plan for the second query;
   (i) storing the second query and the second execution plan in the cache; and
   (j) executing the second execution plan to query the database.

12. The method of claim 11 wherein step (a) further includes the step of:
   i) tokenizing the first query by converting the first query string into a first token to provide a first tokenized query.

13. The method of claim 12 wherein step (c) further includes the step of:
   i) parametertizing the first query by assigning a parameter name to the first constant to provide a first tokenized, parameterized query; and
   ii) storing the first tokenized, parameterized query in the cache.

14. The method of claim 13 wherein step (e) further includes the step of:
   i) tokenizing the second query by converting the second query string into a second token to provide a second tokenized query.

15. The method of claim 14 wherein step (h) further includes the step of:
   i) determining that the second query matches the first query by comparing the second token with the first token.

16. The method of claim 15 wherein step (h)(i) further includes the step of:
   1) establishing parameter association by associating the second constant in the second query with the parameter name assigned to the first constant in the first query; and
   2) substituting the parameter name in the execution plan with the second constant.

17. The method of claim 10 wherein the first query and the second query include database commands, step (g)(i) further including the step of:
   generating signatures for the first and second queries by hashing the database commands contained therein.

18. A computer-readable medium containing program instructions for transparently caching and reusing database query execution plans, the program instructions for:
   (a) caching a first query that contains a first constant, wherein a first query execution plan has been generated for the first query that represents the first constant with a parameter name;
   (b) receiving a new query that contains a second constant;
   (c) generating signatures for the new query and the first query;
   (d) if the signatures match, comparing the new query with the first query and determining that a match exists even when the second constant fails to match the first constant; and
   (e) upon a match, reusing the first query execution plan by substituting the parameter name in the first query execution plan with the second constant from the new query, thereby avoiding generating a new query execution plan for the new query.

19. The computer-readable medium of claim 18 wherein the first query and the new query are in string form, program instructions (a) and (b) further including the program instruction of:
   ii) tokenizing the first query by converting the first query string into a first token and tokenizing the new query by converting the new query sting into a new token, thereby providing a first tokenized query and a new tokenized query.

20. The computer-readable medium of claim 19 wherein program instruction (a) further includes the program instruction of:
   ii) caching the first tokenized query.

21. The computer-readable medium of claim 20 wherein program instruction (d) further includes the program instruction of:
   i) comparing The first token to the new token.

22. The computer-readable medium of claim 21 wherein program instruction (e) further includes the program instruction of:
   i) establishing parameter association by associating the second constant in the new query with the parameter name representing the first constant in the first query.

23. The computer-readable medium of claim 18 wherein the new query string and the first query string include database commands, the computer-readable medium further including the program instruction of:
   i) generating signatures for the new query and the first query by hashing the database commands contained therein.

24. The method of claim 6 wherein step i) further includes the step of:
   il) partitioning a cache according to hash groupings.

25. The method of claim 20 wherein step i) further includes the step of:
   ii) partitioning a cache according to hash groupings.

26. The computer-readable medium of claim 23 wherein program instruction i) further includes the program instruction of:
   il) partitioning a cache according to hash groupings.

* * * * *

UNITED STATES PATENT AND TRADEMARK OFFICE
CERTIFICATE OF CORRECTION

PATENT NO. : 6,466,931 B1  Page 1 of 1
DATED : October 15, 2002
INVENTOR(S) : Gopi K. Attaluri and David J. Wisneski It is certified that error appears in the above-identified patent and that said Letters Patent is hereby corrected as shown below:

<u>Title page,</u>
Item [57], ABSTRACT,
Line 10, after "query" add -- execution plan for the new query --

<u>Column 2,</u>
Line 29, remove "to" and replace with -- two --.

<u>Column 6,</u>
Line 51, remove "suing" and replace with -- string --.

<u>Column 7,</u>
Line 16, remove "The" and replace with -- the --.

Signed and Sealed this

Fifteenth Day of April, 2003

JAMES E. ROGAN
*Director of the United States Patent and Trademark Office*